United States Patent
Ros Gómez et al.

(10) Patent No.: US 12,489,392 B2
(45) Date of Patent: Dec. 2, 2025

(54) SINGLE AXIS SOLAR TRACKER MANAGEMENT METHOD AND SOLAR PLANT IMPLEMENTING SAID METHOD

(71) Applicant: SOLTEC INNOVATIONS S.L., Molina de Segura (ES)

(72) Inventors: Antonio Fabián Ros Gómez, Molina de Segura (ES); Javier Guerrero Pérez, Molina de Segura (ES)

(73) Assignee: SOLTEC INNOVATIONS, S.L., Molina de Segura (ES)

( * ) Notice: Subject to any disclaimer, the term of this patent is extended or adjusted under 35 U.S.C. 154(b) by 0 days.

(21) Appl. No.: 18/016,355

(22) PCT Filed: Jul. 14, 2021

(86) PCT No.: PCT/EP2021/069599
§ 371 (c)(1),
(2) Date: Jan. 16, 2023

(87) PCT Pub. No.: WO2022/013288
PCT Pub. Date: Jan. 20, 2022

(65) Prior Publication Data
US 2023/0275541 A1    Aug. 31, 2023

(30) Foreign Application Priority Data
Jul. 14, 2020    (EP) .................................... 20382629

(51) Int. Cl.
*H02S 20/32*    (2014.01)
*F24S 30/42*    (2018.01)
(Continued)

(52) U.S. Cl.
CPC .............. *H02S 20/32* (2014.12); *F24S 30/42* (2018.05); *F24S 50/20* (2018.05); *G01S 3/7861* (2013.01);
(Continued)

(58) Field of Classification Search
CPC .......... Y02P 80/20; Y02E 10/47; Y02E 10/50; H02S 20/32; H02S 50/00; Y02A 30/00;
(Continued)

(56) References Cited

U.S. PATENT DOCUMENTS 10,541,644 B2    1/2020    Arliaud et al.
11,300,326 B2 *  4/2022    Ma .......................... H02S 10/00
(Continued)

FOREIGN PATENT DOCUMENTS

EP    3303939 B1    4/2020

OTHER PUBLICATIONS

International Search Report for related patent application PCT/EP2021/069599 prepared by the European Patent Office and mailed Oct. 19, 2021, 3 pgs., in English.
(Continued)

*Primary Examiner* — Jennifer D Bennett
(74) *Attorney, Agent, or Firm* — Shakir Law PLLC; Hassan Abbas Shakir

(57) ABSTRACT

A solar plant and single axis solar tracker management method maximize power output production. The object of the invention embraces a solar plant and a method accounting for readings being made by field sensors whilst weather forecast data are provided by third parties such as weather forecast companies collecting and broadcasting weather forecast data related to sun irradiance levels and climate conditions affecting sun irradiance levels, like clouds, pollution or fog. Some of the solar trackers of the plant are furnished with irradiance sensors, whilst the solar plant has a plurality of solar sensors arranged along; these solar sensors being configured to measure irradiance on a horizontal plane. The object of the invention envisages an outpost solar tracker configured to take radiation measurements in an inclined plane and, when it is necessary to verify the measurements of the horizontal sensors, they will go to 0° positions.

5 Claims, 3 Drawing Sheets

(51) Int. Cl.
  *F24S 40/80* (2018.01)
  *F24S 50/20* (2018.01)
  *F24S 50/60* (2018.01)
  *G01S 3/786* (2006.01)
  *G05D 3/10* (2006.01)
  *H02S 50/00* (2014.01)

(52) U.S. Cl.
  CPC ............. *G05D 3/105* (2013.01); *H02S 50/00* (2013.01); *F24S 40/85* (2018.05); *F24S 50/60* (2018.05)

(58) Field of Classification Search
  CPC ........ G01S 3/7861; G01D 3/105; F24S 40/85; F24S 50/60; F24S 30/42; F24S 50/20
  See application file for complete search history.

(56) References Cited

U.S. PATENT DOCUMENTS

| | | |
|---|---|---|
| 2010/0139644 A1 | 6/2010 | Schwarzbach et al. |
| 2011/0158467 A1 | 6/2011 | Lai |
| 2011/0220091 A1 | 9/2011 | Kroyzer |
| 2011/0276269 A1 | 11/2011 | Hummel |
| 2013/0048048 A1 | 2/2013 | Flanery |
| 2017/0093329 A1* | 3/2017 | Jensen .................... H02S 20/32 |
| 2018/0054156 A1* | 2/2018 | Lokey .................... G05D 3/105 |

OTHER PUBLICATIONS

Written Opinion of the International Searching Authority for related patent application PCT/EP2021/069599 prepared by the European Patent Office and mailed Oct. 19, 2021, 3 pgs., in English.

* cited by examiner

SINGLE AXIS SOLAR TRACKER MANAGEMENT METHOD AND SOLAR PLANT IMPLEMENTING SAID METHOD

CROSS-REFERENCE TO RELATED APPLICATIONS

This application is a national stage under 35 U.S.C. § 371 of PCT patent application PCT/EP2021/069599 filed on 14 Jul. 2021, which is pending, which is hereby incorporated by reference in its entirety for all purposes, and to which the present application claims priority. PCT/EP2021/069599 claims priority to European Patent Application 20382629.2 filed on 14 Jul. 2020, which is hereby incorporated by reference in its entirety for all purposes.

OBJECT OF THE INVENTION

The invention relates to the technical field of renewable energies and more particularly to solar energy.

More particularly, the invention is directed to managing and controlling solar trackers, so power production is maximized.

BACKGROUND ART

Due to environmental encouragement, solar power generation has grown in the last decades, being a huge success as a clean and renewable source of energy. Sun power is converted into electricity using solar panels provided with PV cells that require irradiance, the more sun irradiance, the more power is generated, this involves the PV cells. A large part of the solar success story is the increasing use of tracking systems moving solar panels to follow the sun across the sky.

Traditional trackers are basically timers that move the panels across the sky with the movement of the sun. While the sun is indeed predictable, clouds are unpredictable, and panels can shade each other if they are not on perfectly flat terrain.

Known solutions encompass the deployment of sensors and control systems that monitor actual sunlight and move each row of panels individually to maximize performance. For example, when clouds convert direct sunlight into diffuse light, it is better if the panels point straight up to capture a maximum amount of diffuse light than to point to the blocked sun; whereas, when the sun is low in the sky, the angle of each row of panels can be adjusted to minimize the shading of the row behind; this procedure is known as backtracking.

U.S. Pat. No. 10,541,644B2 discloses a method for controlling the orientation of a single-axis solar tracker orientable about an axis of rotation, the method of U.S. Pat. No. 10,541,644B2 encompasses observing the evolution over time of the cloud coverage above the solar tracker; determining the evolution over time of an optimum inclination angle of the solar tracker substantially corresponding to a maximum of solar radiation on the solar tracker, depending on the observed cloud coverage; predicting the future evolution of the cloud coverage based on the observed prior evolution of the cloud coverage; calculating the future evolution of the optimum inclination angle according to the prediction of the future evolution of the cloud coverage; servo-controlling the orientation of the solar tracker according to the prior evolution of the optimum inclination angle and depending on the future evolution of the optimum inclination angle.

EP3303939B1 proposes a method for controlling the orientation of a single-axis solar tracker orientable around an axis of rotation, said method repeatedly performing successive control phases, where each control phase implements successive stages of: observing the cloud cover above the solar tracker; compare the cloud cover observed with cloud cover models archived in a database, each cloud cover model being associated with an orientation instruction from the solar tracker; matching the cloud cover observed with a cloud cover model; processing the orientation of the solar tracker by applying the orientation instruction associated with said cloud cover model selected during matching. In EP3303939B1 the observation of the cloud coverage is translated into a mapping of the solar luminance according to different elevation angles and, the cloud coverage models are constituted by cartographic models and the comparison is based on a comparison between the distribution of the solar luminance on the mapping with the distribution of the solar luminance in the different cartographic models.

US 2011158467A1 discloses a method for controlling the orientation of a single-axis solar tracker orientable around an axis of rotation, said method implementing the following steps: observing the evolution over time of the coverage cloud over the solar tracker, observing the cloud cover at several consecutive times using a sky observation system over the solar tracker; translate each observation made by the observation system into a map of solar luminance and determine the evolution over time of an optimal tilt angle of the solar tracker corresponding substantially to a maximum of solar radiation on the solar tracker, function of the cloud cover observed, by calculating for each mapping at each instant an optimal angle of inclination associated with a maximum of solar luminance on said mapping; and control the orientation of the solar tracker according to the previous evolution of the optimal angle of inclination.

US 2011220091A1 discloses that representative images of the shadows of the clouds with respect to a field of heliostats can be used to adjust the operation of a solar energy system.

US 2010139644A1 discloses the embodiments relate to solar energy systems and corresponding operating methods. In some embodiments, the solar energy system comprising: a plurality of heliostats configured to reflect sunlight on a target mounted on a tower, each heliostat comprising a respective heliostat controller, the target being selected from the group consisting of an energy conversion target.

SUMMARY OF THE INVENTION

The object of the invention solves the problem of aiming the solar panel by means of the solar tracker positioning the panel on a maximum power out position when global solar irradiance, hereinafter irradiance, decreases due to environment conditions. This is achieved by detecting said conditions that decrease the incidence of direct irradiance using field sensors combined with weather and irradiance forecast; which properly processed allow to determine a movement command to be sent to the solar tracker, consequently modifying the position of the solar panel.

The object of the invention encompasses a first aspect of the invention aimed to a method and a second aspect of the invention aimed at a solar plant being both intended and configured for maximizing energy production by performing calculations based on field measurements combined with irradiance predictions coming from third parties.

In order to do so, some of the solar trackers at the solar plant are equipped with solar sensors to measure irradiance on the tracking plane. These solar trackers will provide measurements of irradiance on the tracking plane, so they should be as representative as possible of the average plant conditions. In turn, they must be close to their corresponding solar sensor, the sensor arranged on the solar plant to measure horizontal plane irradiance so that when both sensors are horizontal, they can be considered to offer the same measurement of irradiance level. Considering that the horizontal sensor is meant to be associated to a mounting structure, preferably forming a part of a Gateway Cabinet (GWC), solar trackers furnished with solar tracker sensors to measure and determine irradiance, must be arranged near one of these structures.

Considering these two main requirements, the method for choosing the location of the solar tracker sensors may account for locating all Gateway Cabinet (GWC), assuming the mounting structures are forming a part of the GWC. Select all solar trackers within a range of two solar trackers associated to each Gateway Cabinet (GWC), getting North-South slope values of such solar trackers and the north-south slope average value of the solar plant. For the selected solar trackers, picking at least one solar tracker with a North-South slope value being closest to the north-south slope average value of the solar plant, not exceeding the standard deviation of the north-south slopes of the plant, discarding all other solar trackers near the same Gateway Cabinet (GWC); equipping at least one of said solar trackers with solar trackers sensor and repeating until obtaining the desired number of solar trackers equipped with solar sensors to measure tracking plane irradiance levels.

The number of sensors equipped solar trackers depends on the solar plant features, always fulfilling a minimum of two horizontal-tilt pairs of sensors equipped solar trackers. If the plant has areas with clearly differentiated slopes, it is advisable to put at least a couple of sensors equipped solar trackers in each area. Depending on the size of the plant, it is also convenient to put extra sensor equipped solar trackers to make the data more representative of the plant. In a preferred embodiment of either aspect of the object of the invention a pair of sensors equipped solar trackers per 50 MW is provided.

Some types of sensor failures are easily identifiable, for example communication failures imply no measurements, and a gap would appear in the data. However, dirt on sensors or the presence of shadows may be enough for the data to be inaccurate and represent wrong measurements, for example readings representing higher irradiance values on the horizontal plane. Should this be the case, the problem could be solved by making the same sensor take both horizontal and inclined measurements. This is the function the outpost solar tracker accomplishes, when monitoring, the outpost solar tracker takes radiation measurements in an inclined plane and, when it is necessary to verify the measurements of the horizontal sensors, they will go to 0° positions. The outpost tracker does not have to be a specific tracker but the first of the sensor equipped solar trackers with which communication can be established, therefore communication failures may be avoided.

This is done by configuring one solar tracker controller associated to an irradiance sensor, hereinafter solar tracker sensors, being set to 0°, once positioned at 0° a radiation check is carried out by means of the associated irradiance sensor. Should the irradiance levels increase when positioning the solar tracker at a horizontal plane position, then said solar tracker controller would be set to tracking and the rest of solar trackers on the solar plant would be set to stow position. Those trackers associated to irradiance sensors are not allowed to be positioned at stow position.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 2b is a side view of a solar tracker taken from the side between the first and second leftmost solar trackers in accordance with one or more embodiments of the present invention, wherein the tracking plane and the horizontal plane are parallel.

DETAILED DESCRIPTION

Figure 1:
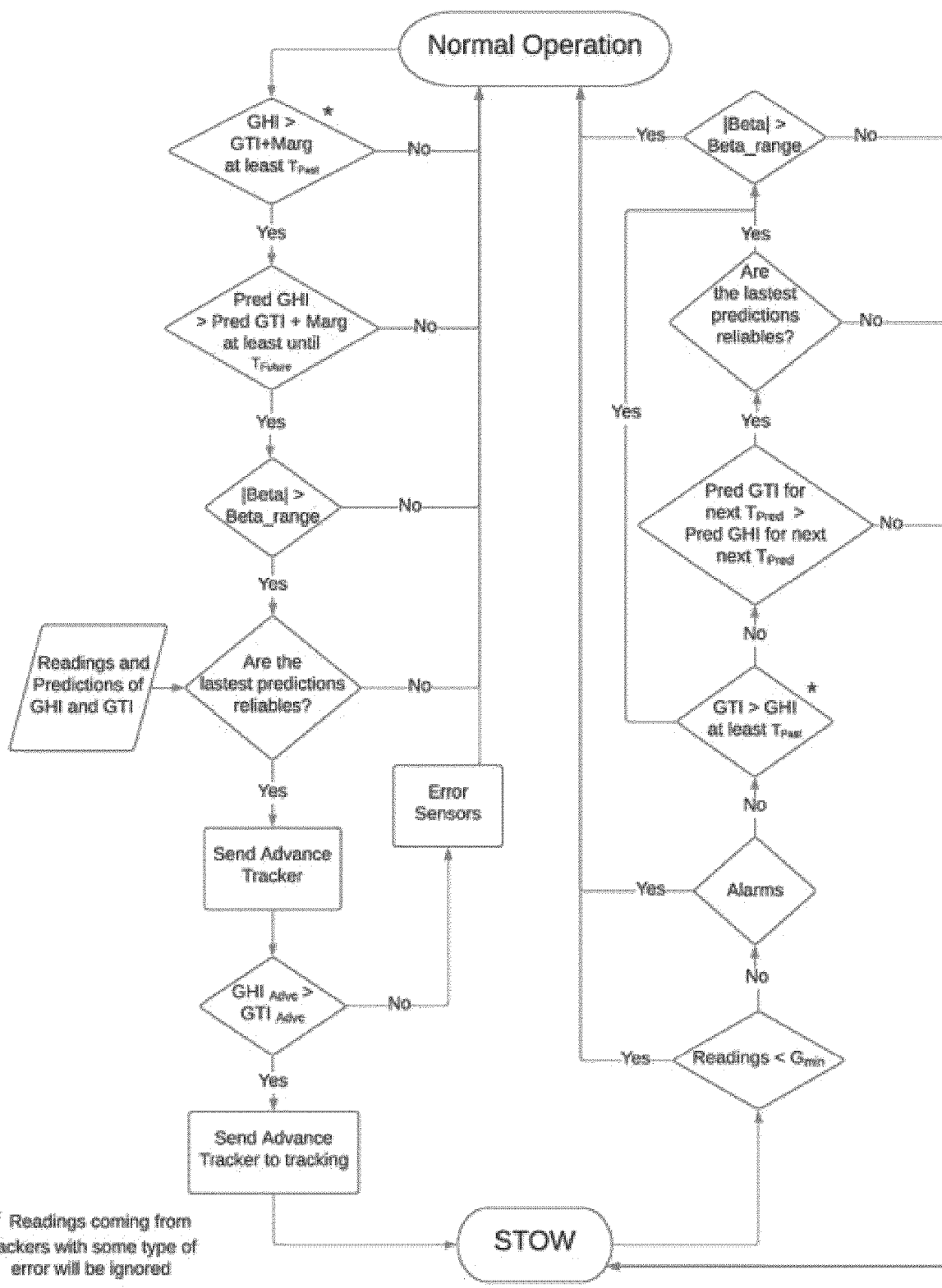
FIG. 1.—Shows a diagram representing the flowchart of the method of the invention.

The object of the invention may start as represented in FIG. 1, from a normal tracking state at a solar plant comprising solar trackers associated to respective solar panels, and the pant being furnished with at least one solar sensor able to measure and determine solar irradiance on a horizontal plane.

With some of the solar trackers being associated to solar tracker sensors to measure irradiance on a tracking plane of the respective solar tracker, the method may start by a step of continuously evaluating whether stow conditions are met for each solar panel or not; consequently, for a solar tracker with solar tracker sensors being operated by a solar tracker controller; said stow conditions may be listed as follows:

1. There is more irradiance on the horizontal plane than on the tracking plane; this being determined by means of sensor readings, in such a way that horizontal plane measurements will be carried out by means of the solar plant sensors deployed along the solar plant, whereas tracking measurements will be carried out by means of the solar tracker sensors associated to some of the solar trackers. Those solar trackers equipped with solar tracker sensors cannot be brought to stow position since the tracking plane readings would be lost and the method of the invention requires from those.
2. This situation is predicted to continue for a time, this is determined by means of forecasts provided by third parties.
3. Any solar tracker furnished with solar tracker sensors is not positioned at an angle close to 0°, being 0° a position at the horizontal plane where the solar panel are levelled in an east-west direction facing upwards; being this a stow position.

Hence the object of the invention embraces a solar plant and a method accounting for readings being made by field sensors whilst weather forecast data are provided by third parties such as weather forecast companies collecting and broadcasting weather forecast data related to sun irradiance levels and climate conditions affecting sun irradiance levels, like clouds, pollution or fog.

Once these conditions are met, the solar plant (and therefore all the solar trackers deployed thereon) may be brought to a stow position, but as an intermediate phase of verification, one of the solar trackers that is furnished with the at least one sensor able to measure and determine solar irradiance, is brought to 0° thus configuring said solar tracker as an outpost solar tracker. Once verified that an irradiance value measured by the sensor of the outpost solar determines an increase of solar irradiance when bringing the associated solar panel to the horizontal plane, then the outpost solar tracker is commanded to return to tracking mode and the rest of the solar tackers in the solar plant are commanded to be sent to a stow position. If not, it means that there is an error in the sensors, hence a corresponding warning will be generated and the solar trackers at the solar plant will continue tracking.

Once the solar trackers not being furnished with solar tracker sensors are set at stow position, it is periodically reviewed to see if any of the conditions to return to the normal operating mode are met, these are:

Low or no solar irradiance available, i.e. night-time.
There is an active alarm.
Higher irradiance levels are being read in the tracking plane *
It is predicted that there will be more radiation in the tracking plane in a short time (preferably a time period comprised between 15 and 60 minutes) *

* These two cases will only be considered when the solar tracker is not already in a position close to 0°.

If any of these conditions is met, the tracking state is returned and the conditions to go to Stow are started again.

Figure 2A:
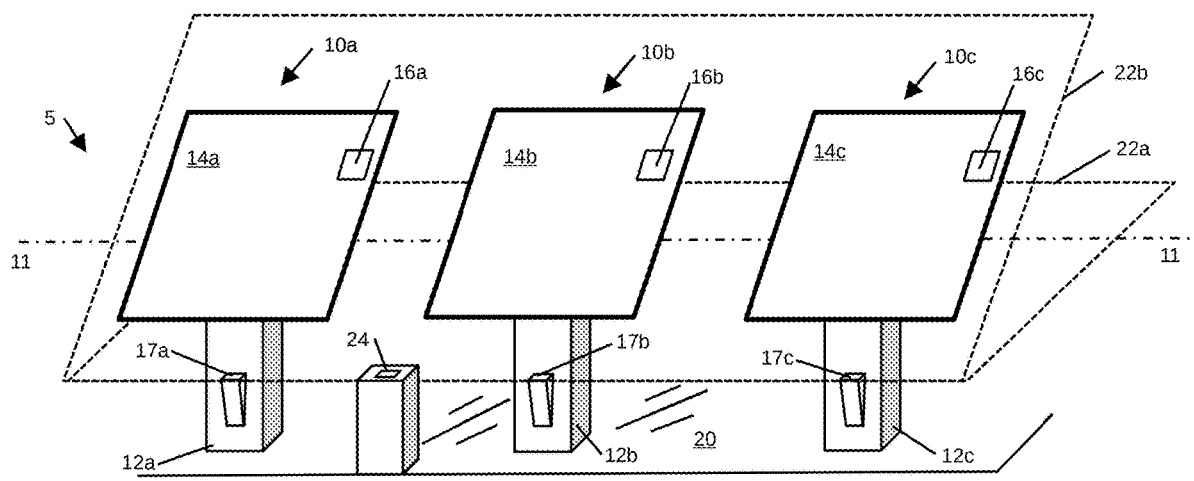
FIG. 2a is a perspective view of a plurality of solar trackers in accordance with one or more embodiments of the present invention.
Figure 2B:
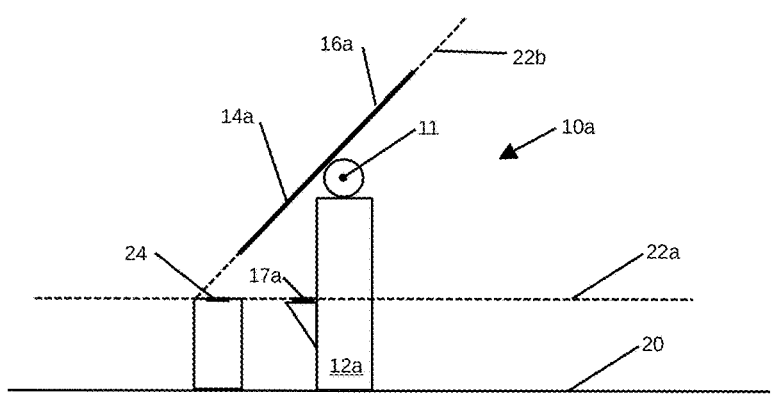
FIG. 2b is a side view of a solar tracker taken from the side between the first and second leftmost solar trackers in accordance with one or more embodiments of the present invention, wherein the tracking plane and the horizontal plane are not parallel.
Figure 2C:
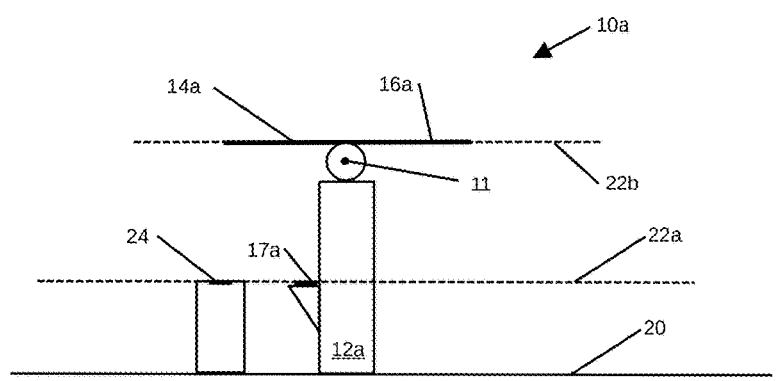

With respect to FIGS. 2a, 2b, and 2c, a method for managing single axis solar trackers 10a, 10b, 10c (axis is 11) fixed to the ground 20 by posts 12a, 12b, 12c deployed on a solar plant 5, the method being characterised by comprising:

measuring solar irradiance on a solar panel 14a, 14b, 14c associated to said at least one single axis solar tracker 10a, 10, 10b by means of at least one sensor 16a, 16b, 16c configured to measure solar irradiance arranged on the solar plant 5 in such a way that said sensor 16a, 16b, 16c measures solar irradiance in both:
a horizontal plane 22a, corresponding to a plane parallel to the ground 20 and
a tracking plane 22b corresponding to a plane embracing the solar panel 14a, 14b, 14c,
collecting weather and irradiance forecast data,
measuring irradiance on the horizontal plane 22a by means of sensors 24 arranged on the horizontal, and the irradiance on the tracking plane irradiance of the solar panel by means of said solar tracker sensors 16a, 16b, and 16c arranged along the solar plant 5,
comparing irradiance levels on the horizontal plane 22a and on the tracking plane 22b, continuously determining stow conditions for each solar tracker 10a, 10b, 10c, said conditions being listed as:
higher irradiance levels on the horizontal plane 22a than in the tracking plane 22b,
higher irradiance levels on the horizontal plane 22a than in the tracking plane 22b to continue for a certain time period according to weather forecast data, and
the solar trackers 10a, 10b, 10c are not positioned at an angle close to the horizontal plane 22a,
bringing to a stow position, wherein the solar panel 14a, 14b, 14c is in the horizontal plane 22a, one of the solar trackers 10a, 10b, and 10b being arranged next to the sensor 16a, 16b, 16c configuring said solar tracker as an outpost solar tracker 10c,
verifying that irradiance values measured in the previous steps determine an increase of solar irradiance when bringing the outpost solar tracker 10c to the horizontal plane 22a,
commanding:
the outpost solar tracker 10c to tracking mode, and
the remaining solar trackers 10a, 10b to stow position.
once the remaining solar trackers 10a, 10b are set at stow position, it is periodically checked whether the conditions to return to the normal operating mode are met, these are:
low or no solar irradiance available,
there is an alarm associated to sensors malfunctioning, and
when the solar tracker 10a, 10b, 10c is not already in a position close to the horizontal plane 22b the conditions further comprise:
higher irradiance levels are being read in the tracking plane 22b, and
it is predicted that there will be more radiation in the tracking plane 22b in a time period comprised between 15 and 60 minutes.

The method for managing single axis solar trackers 10a, 10b, 10c deployed on a solar plant 5 wherein the weather forecast data are provided by a third party.

The method for managing single axis solar trackers 10a, 10b, and 10c deployed on a solar plant 5 wherein the sensor 16a, 16b, 16c is arranged on a structure 12a, 12b, 12c having a height equal or approximately similar to that of the post of the solar trackers, sensors 17a, 17b, and 17c instead of sensor 24.

The method for managing single axis solar trackers deployed on a solar plant wherein the weather forecast data are related to sun irradiance and climate conditions affecting sun irradiance levels, like clouds, pollution or fog.

The method for managing single axis solar trackers 10a, 10b, and 10c deployed on a solar plant 5 further comprising generating active alarm associated to sensors 16a, 16b, 16c malfunctioning when the outpost solar tracker 10c is not set to tracking operation mode and the rest of the solar trackers 10a, 10b are not sent to stow position.

The method for managing single axis solar trackers 10a, 10b, and 10c deployed on a solar plant 5 wherein the outpost solar tracker 10c is a first solar tracker equipped with solar tracker sensor 16c contacted by means of the communication network.

The method for managing single axis solar trackers 10a, 10b, and 10c deployed on a solar plant wherein solar trackers 10am 10b, and 10c furnished with solar tracker sensors 16a, 16b, 16c to measure and determine irradiance are arranged near to solar sensors 24 so that when both sensors 16a, 16b, 16c, and 24 are horizontal, they can be considered to offer the same measurement of irradiance.

A solar plant 5 comprising solar trackers operating solar panels, the solar plant comprising:
solar sensors 24 arranged along the solar plant 5 and configured to measure irradiance on the horizontal plane 22a of the solar panel, and
solar tracker sensors 16a, 16b, 16c arranged on some of the solar trackers 16a, 16b, 16c and configured to measure irradiance on the tracking plane 22b of the solar panel.

What is claimed is:

1. A method of managing a plurality of solar trackers defining a solar plant, each solar tracker of the plurality of solar trackers being a single axis tracker and being fixed to the ground by a post, the method comprises the steps of:
   (a) collecting weather and irradiance forecast data;
   (b) measuring irradiance on a horizontal plane using a first sensor arranged on the horizontal plane, the horizontal plane being perpendicular to the radius of the Earth;
   (c) measuring irradiance on a tracking plane of a solar panel associated with a first solar tracker of the plurality of solar trackers using a second sensor disposed on the solar panel for tracking the Sun;
   (d) comparing a first irradiance level on the horizontal plane and a second irradiance level on the tracking plane;
   (e) subsequent to step (d):
      continuously determining stow conditions for each solar tracker of the plurality of solar trackers, the stow conditions comprising:
      the first irradiance level on the horizontal plane is greater than the second irradiance level in the tracking plane;
      the first irradiance level on the horizontal plane being greater than the second irradiance level in the tracking plane continues for a predetermined time period according to the weather forecast data, and
      the plurality of solar trackers are not positioned near the horizontal plane;
   (f) if all the stow conditions of step (e) are met, bringing to a stow position a second solar tracker of the plurality of solar trackers being arranged next to the first sensor and identifying the second solar tracker as an outpost solar tracker, wherein the stow position is defined by the tracking plane of the first solar tracker of the plurality of solar trackers being parallel to the horizontal plane;
   (g) verifying that the first irradiance level and the second irradiance level in the step (e) determine an increase of solar irradiance when bringing the tracking plane of the outpost solar tracker parallel to the horizontal plane,
   (h) commanding:
      the outpost solar tracker to tracking mode, and
      remaining solar trackers of the plurality of solar trackers to their respective stow positions,
   (i) when the remaining solar trackers are at their respective stow positions, periodically checking whether at least one of the following conditions to return to normal operating mode is met:
      low or no solar irradiance available; or
      there is an alarm associated to at least one of the sensors malfunctioning, and
      when the tracking plane of the first solar tracker is not already close to being parallel to the horizontal plane, the conditions further comprise:
         higher irradiance levels are being read in the tracking plane, and
      a prediction is made that there will be higher radiation in the tracking plane in a time period comprised between 15 and 60 minutes.

2. The method of managing a plurality of solar trackers defining a solar plant according to claim 1, wherein the weather forecast data is provided by a third party.

3. The method of managing a plurality of solar trackers defining a solar plant according to claim 1, wherein the first sensor is arranged on a structure having a height equal or approximately similar to that of the post of the solar trackers.

4. The method of managing a plurality of solar trackers defining a solar plant according to claim 1, wherein the weather forecast data are related to sun irradiance and climate conditions affecting sun irradiance levels, the climate conditions being clouds, pollution or fog.

5. The method of managing a plurality of solar trackers defining a solar plant according to claim 1, further comprising generating active alarm associated to the second sensor malfunctioning when the outpost solar tracker is not set to tracking operation mode and the rest of the solar trackers are not sent to the stow position.

* * * * *